(12) United States Patent
Hara et al.

(10) Patent No.: US 10,579,183 B2
(45) Date of Patent: Mar. 3, 2020

(54) TOUCH PANEL, SIGNAL PROCESSING DEVICE, AND COUPLING METHOD

(71) Applicant: Wacom Co., Ltd., Saitama (JP)

(72) Inventors: Hideyuki Hara, Tokyo (JP); Sadao Yamamoto, Tokyo (JP); Susumu Yamada, Gunma (JP)

(73) Assignee: Wacom Co., Ltd., Saitama (JP)

( * ) Notice: Subject to any disclaimer, the term of this patent is extended or adjusted under 35 U.S.C. 154(b) by 178 days.

(21) Appl. No.: 15/351,166

(22) Filed: Nov. 14, 2016

(65) Prior Publication Data

US 2017/0177145 A1   Jun. 22, 2017

(30) Foreign Application Priority Data

Dec. 17, 2015   (JP) .................................. 2015-246746

(51) Int. Cl.
*G06F 3/041* (2006.01)
*G06F 3/044* (2006.01)
*G06F 3/0354* (2013.01)

(52) U.S. Cl.
CPC ........ *G06F 3/0416* (2013.01); *G06F 3/03545* (2013.01); *G06F 3/044* (2013.01)

(58) Field of Classification Search
CPC ..... G06F 3/0416; G06F 3/044; G06F 3/03545
See application file for complete search history.

(56) References Cited

U.S. PATENT DOCUMENTS

| 8,692,779 B2 | 4/2014 | Oda et al. |
| 9,158,418 B2 | 10/2015 | Oda et al. |
| 9,235,288 B2 | 1/2016 | Yamamoto et al. |
| 2013/0106731 A1* | 5/2013 | Yilmaz ................. G06F 3/0346 345/173 |
| 2014/0176495 A1* | 6/2014 | Vlasov ................ G06F 3/03545 345/174 |
| 2016/0266673 A1 | 9/2016 | Dinu et al. |

FOREIGN PATENT DOCUMENTS

| JP | 2011-3035 A | 1/2011 |
| JP | 2011-3036 A | 1/2011 |
| JP | 2012-123599 A | 6/2012 |
| JP | 5762659 B1 | 8/2015 |

\* cited by examiner

*Primary Examiner* — Aneeta Yodichkas
(74) *Attorney, Agent, or Firm* — Seed IP Law Group LLP

(57) ABSTRACT

A touch panel has a plurality of conductors arranged for a position detection area and can detect a position pointed to by an active stylus held by a user and a manual touch by the user holding the active stylus. The touch panel includes: a signal transmission circuit that transmits, by capacitive coupling, a signal to the active stylus that can receive the signal transmitted from the touch panel by capacitive coupling with the touch panel; an active stylus pointing position detection circuit that detects the position pointed to by the active stylus by capacitive coupling with the active stylus; a touch detection circuit that detects the manual touch by the user; and a coupling control circuit that performs coupling control to couple one or more of the plurality of conductors and a ground of the touch panel in accordance with a touch detection result of the touch detection circuit.

20 Claims, 14 Drawing Sheets

FIG.11A
COMMAND SIGNAL (FREQUENCY f1)
FIG.11B
TOUCH DETECTION SIGNAL (FREQUENCY f2)
FIG.11C
PEN POINTING DETECTION SIGNAL (FREQUENCY f3)
FIG.12A
TOUCH DETECTION
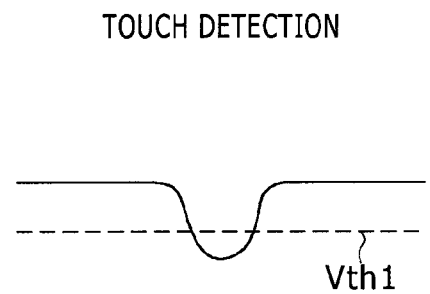
Vth1
FIG.12B
PEN-POINTED POSITION DETECTION
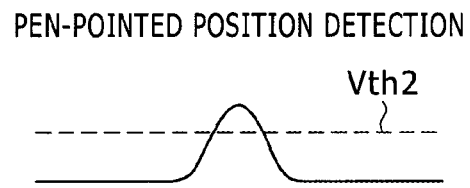
Vth2
FIG.13A
COMMAND SIGNAL (FREQUENCY f1)
FIG.13B
TOUCH DETECTION SIGNAL (FREQUENCY f2)
FIG.13C
PEN POINTING DETECTION SIGNAL (FREQUENCY f3)

TOUCH PANEL, SIGNAL PROCESSING DEVICE, AND COUPLING METHOD

BACKGROUND OF THE INVENTION

1. Field of the Invention

The present disclosure relates to a touch panel that transmits signals to an active stylus by capacitive coupling. The present disclosure further relates to a signal processing device suitable for use in a touch panel that transmits signals to an active stylus by capacitive coupling. The present disclosure still further relates to a coupling method between a touch panel circuit ground and an external ground.

It should be noted that an active stylus refers to an electronic pen that interactively exchanges signals with a touch panel by capacitive coupling in the present specification.

2. Description of the Related Art

A position input device that includes a position detection device and an electronic pen is available in various types such as those based on electromagnetic induction and capacitive coupling depending on the difference in coupling between a position detection sensor of the position detection device and the electronic pen. In addition, despite being based on the same coupling method, position input devices are varied in configuration depending on the difference in position detection signals exchanged between the position detection sensor and the electronic pen, presence or absence of a writing pressure detection section, presence or absence of a side switch, and so on.

However, having available electronic pens to suit various configurations not only leads to cost burden on users but also makes it necessary to manage each of the electronic pens having different configurations in association with a position detection device, thus resulting in a cumbersome task.

To solve such a problem, Patent Document 1 (Japanese Patent No. 5762659) proposes that a position detection device send a signal to an electronic pen such that the electronic pen suits the position detection device.

If the electronic pen and the position detection device are connected by wiring, connection wires turn into a nuisance. Therefore, it is common to connect them wirelessly. In this case, if an active stylus, an electronic pen based on capacitive coupling, is used, signals from the position detection sensor are transferred to the capacitively coupled active stylus.

However, it has been discovered, in connection with transfer of signals from a position detection sensor to an active stylus, that the signal strength declines due to the following two reasons.

One of the reasons why signal strength declines is because the ground of a signal processing circuit of an electronic apparatus that transmits signals to the active stylus through capacitive coupling is not stable. This will be described with reference to FIGS. 18 to 21B.

As illustrated in FIGS. 18 to 20, signals are sent from a signal transmission circuit 1000S, a signal processing circuit of an electronic apparatus 1000 having a position detection sensor, to an active stylus 2000. In this case, a commercial power supply or a built-in battery is used as a power supply of the electronic apparatus 1000. If the built-in battery is used, the ground of the signal processing circuit of the electronic apparatus 1000 is unstable.

That is, if a commercial power supply is used as a power supply of the electronic apparatus 1000, the electronic apparatus 1000 is connected to an alternating-current (AC) adapter 3000 as illustrated in FIG. 18. The ground of the AC adapter 3000 is connected to an external ground, an earth ground whose potential is stable. In this case, therefore, the ground of the signal processing circuit of the electronic apparatus 1000 (hereinafter referred to as a circuit ground) is coupled to the external ground because the electronic apparatus 1000 is connected to the AC adapter 3000.

For this reason, a point SA on the side of the circuit ground of the signal transmission circuit 1000S of the electronic apparatus 1000 (corresponds to a ground electrode in the electronic apparatus; the same applies hereinafter) is coupled to the external ground, making the potential thereof stable as illustrated in FIG. 19A. Therefore, a signal level of a point SB on the side of an output terminal does not decline as illustrated in FIG. 19B. This makes it possible to transfer the transmission signal from the position detection sensor to the active stylus 2000 with no decline in its strength.

On the other hand, if a built-in battery is used as a power supply of the electronic apparatus 1000 rather than connecting the electronic apparatus 1000 to the AC adapter 3000 as illustrated in FIG. 20, the circuit ground of the signal processing circuit of the electronic apparatus 1000 is not coupled to the external ground, making the circuit ground floating. For this reason, the potential of the point SA on the side of the circuit ground of the signal transmission circuit 1000S swings significantly in response to the signal as illustrated in FIG. 21A depending on the magnitude of coupling between the external ground and the circuit ground of the signal transmission circuit 1000S of the electronic apparatus 1000. As a result, the signal level of the point SB on the side of the output terminal of the signal transmission circuit 1000S declines as illustrated in FIG. 21B, as compared to when the electronic apparatus 1000 is connected to the AC adapter 3000 (case illustrated in FIG. 19B). That is, the strength (amplitude) of the signal transmitted from the position detection sensor of the electronic apparatus 1000 to the active stylus 2000 declines.

Another reason why the signal level declines is because the signal from the electronic apparatus 1000 wraps around through the user's body of the active stylus 2000. This will be described with reference to FIGS. 22 and 23C.

The active stylus 2000 receives a signal from the position detection sensor of the electronic apparatus 1000 in this example with an antenna 2001 as illustrated in FIG. 22. The antenna 2001 includes a conductor (core body in the example illustrated in FIG. 22). The reception signal is, for example, passed through an operational amplifier 2002 and a frequency-limiting filter 2003, and then supplied to a controller 2004. The controller 2004 controls, in response to the reception signal, the transmission circuit which is not illustrated in FIG. 22.

A supply voltage is supplied to the operational amplifier 2002, the filter 2003, and the controller 2004 from a built-in battery 2005. Then, the operational amplifier 2002, the filter 2003, the controller 2004, and the built-in battery 2005 are connected to the circuit ground of the active stylus 2000. This circuit ground of the active stylus 2000 is also connected to a conductive enclosure, thus serving as a reference potential for the operational amplifier 2002 that amplifies reception signals.

In this case, the electronic apparatus 1000 and the antenna 2001 are capacitively coupled via a coupling capacitance Ct. Further, when the active stylus 2000 is held by the user and used over the position detection sensor of the electronic apparatus 1000, the circuit ground of the active stylus 2000 and the position detection sensor of the electronic apparatus 1000 are capacitively coupled via the human body that is equivalent to a capacitance Ch and a resistance Rh.

Then, if the difference is small between the coupling capacitance Ct between the electronic apparatus 1000 and the antenna 2001 and the coupling capacitance Ch between the electronic apparatus 1000 and the circuit ground of the active stylus 2000, the signal from the electronic apparatus 1000 wraps around to the active stylus 2000 via the human body. The operational amplifier 2002 detects a differential signal between the circuit ground of the active stylus 2000 and the antenna 2001. Because of the signal wraparound from the electronic apparatus 1000, the signal received by the active stylus 2000 diminishes in strength. In some cases, the phase of the waveform of the signal from the electronic apparatus 1000 becomes inverted in the active stylus 2000.

FIGS. 23A to 23C illustrate examples of signal strength at a coupling point PA between the coupling capacitance Ct and the antenna 2001 (refer to FIG. 23A), at a coupling point PB between the circuit ground of the active stylus 2000 and the coupling capacitance Ch (refer to FIG. 23B), and at an output terminal PC of the operational amplifier 2002 (refer to FIG. 23C). As illustrated in FIGS. 23A to 23C, the signal strength of the output terminal PC of the operational amplifier 2002 (refer to FIG. 23C) diminishes or becomes inverted in accordance with a relation in magnitude between the coupling capacitances Ct and Ch.

That is, when the coupling capacitance Ct is greater than the coupling capacitance Ch (Ct>Ch), the signal strength of the output terminal PC of the operational amplifier 2002 diminishes as illustrated on the left side in FIGS. 23A to 23C. Further, when the coupling capacitance Ct is equal to the coupling capacitance Ch (Ct=Ch), the signal strength of the output terminal PC of the operational amplifier 2002 is zero as illustrated in the middle in FIGS. 23A to 23C. Still further, when the coupling capacitance Ct is smaller than the coupling capacitance Ch (Ct<Ch), the signal strength of the output terminal PC of the operational amplifier 2002 diminishes, and the signal is inverted as illustrated on the right side in FIGS. 23A to 23C.

It should be noted that although FIG. 22 illustrates an example in which the enclosure of the active stylus 2000 is made of a conductor with the enclosure serving as a circuit ground, it is not necessary to use an enclosure made of a conductor. That is, even when a ground conductor is formed on a printed circuit board inside the active stylus 2000, the same problem as described above occurs because of capacitive coupling between the user's body and the ground conductor of the printed circuit board.

SUMMARY OF THE INVENTION

It is desirable to solve the above problem.

According to embodiments of the present disclosure, there is provided a touch panel that has a plurality of conductors arranged for a position detection area and that can detect a position pointed to by an active stylus held by a user and manual touch by the user holding the active stylus.

The touch panel includes a signal transmission circuit, an active stylus pointing position detection circuit, a touch detection circuit, and a coupling control circuit. The signal transmission circuit transmits signals to the active stylus by capacitive coupling. The active stylus can receive signals transmitted from the touch panel by capacitive coupling with the touch panel.

The active stylus pointing position detection circuit detects a position pointed to by the active stylus by capacitive coupling with the active stylus.

The touch detection circuit detects a manual touch by the user.

The coupling control circuit performs coupling control designed to achieve coupling between a conductor and a ground of the touch panel in accordance with a touch detection result of the touch detection circuit. The conductor is arranged in the touch panel and is capacitively coupled with the user's hand whose touch was detected by the touch detection circuit.

In the touch panel configured as described above, if the user holds the active stylus and brings it over the touch panel, a touch on the touch panel with the user's hand is detected. As a result, a conductor capacitively coupled with the user's hand whose touch was detected is coupled with the ground of the touch panel (circuit ground). This causes the conductor coupled with the touch panel ground (circuit ground) to be coupled with an external ground via a body of the user.

For this reason, even when not connected to the external ground, the touch panel ground (circuit ground) is connected to the external ground via a human body (hand) that is in contact with the touch panel. This prevents a signal transmitted to the active stylus from diminishing in strength.

Further, connection of the touch panel ground (circuit ground) to the external ground contributes to strong coupling with the human hand that is connected to the external ground. This keeps, to a minimum, signal wraparound from the touch panel to the active stylus via the human hand holding the active stylus by allowing the signal to flow to the external ground. As a result, it is possible to reduce or prevent decline in signal strength received by the active stylus and signal inversion.

The present disclosure ensures that the touch panel ground (circuit ground) is connected to the external ground via the human body (hand) that touches the touch panel even when the touch panel ground is not connected to the external ground, thus reducing or preventing decline in signal strength received by the active stylus and signal inversion.

Further, connection of the touch panel ground (circuit ground) to the external ground contributes to strong coupling with the human hand that is connected to the external ground. This keeps, to a minimum, signal wraparound from the touch panel to the active stylus via the human hand by allowing the signal to flow to the external ground. As a result, it is possible to reduce or prevent decline in signal strength received by the active stylus and signal inversion.

BRIEF DESCRIPTION OF THE DRAWINGS

FIGS. 11A to 11C are diagrams used to describe another embodiment of the touch panel according to the present disclosure;

FIGS. 12A and 12B are diagrams used to describe another embodiment of the touch panel according to the present disclosure;

FIGS. 13A to 13C are diagrams used to describe another embodiment of the touch panel according to the present disclosure;

FIGS. 19A and 19B are diagrams used to describe the state illustrated in FIG. 18;

FIGS. 21A and 21B are diagrams used to describe the state illustrated in FIG. 20;

DETAILED DESCRIPTION OF THE PREFERRED EMBODIMENTS

A description will be given below of embodiments of a touch panel according to the present disclosure with reference to the accompanying drawings. It should be noted that the embodiments of the touch panel described below include those of a signal processing device and a method of coupling between a circuit ground and an external ground. In this case, the earth's potential is normally used as an external ground. However, the external ground is not limited to the earth's potential as long as it has a fixed potential.

Figure 1:
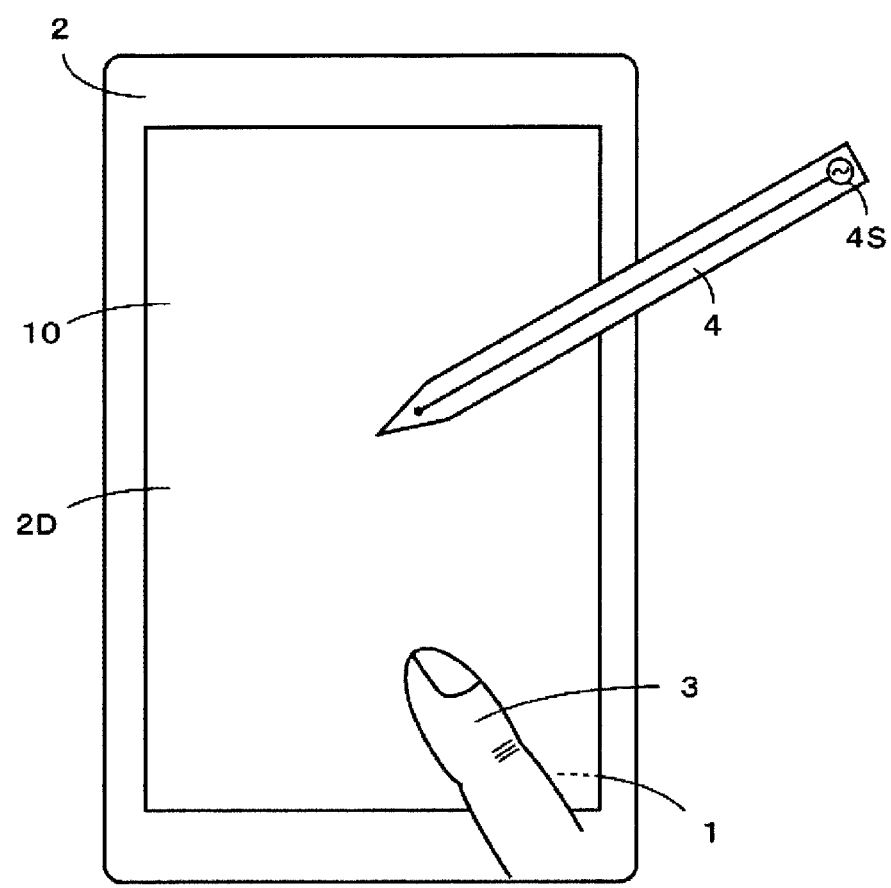
FIG. 1 is a diagram used to describe an embodiment of a touch panel according to the present disclosure.

FIG. 1 illustrates an example of an electronic apparatus 2 having a touch panel 1 according to the present disclosure. A signal processing device and a coupling method between a circuit ground and an external ground according to the present disclosure are applied to the touch panel 1. The electronic apparatus 2 illustrated in FIG. 1 is a mobile device such as a pad personal computer (PC) or a mobile phone terminal called a smartphone. Such a mobile device includes a display screen 2D of a display device such as liquid crystal display (LCD). A sensor (position detection sensor) making up the touch panel 1 is arranged on a front portion of the display screen 2D. Also, the electronic apparatus 2 has a battery (not illustrated) as a power supply in this example.

If a position pointing operation is performed with a pointer on the sensor 10 arranged on the front portion of the display screen 2D of the electronic apparatus 2, the touch panel 1 can detect the position pointed to by the pointer and can perform display processing appropriate to the operated position thanks to a microcomputer included in the electronic apparatus 2. In this example, the touch panel 1 can detect, as a pointer, both the user's hand or finger 3 and an active stylus 4, an active capacitive pen that sends a transmission signal.

[Configuration Example of Touch Panel 1]

Figure 2:
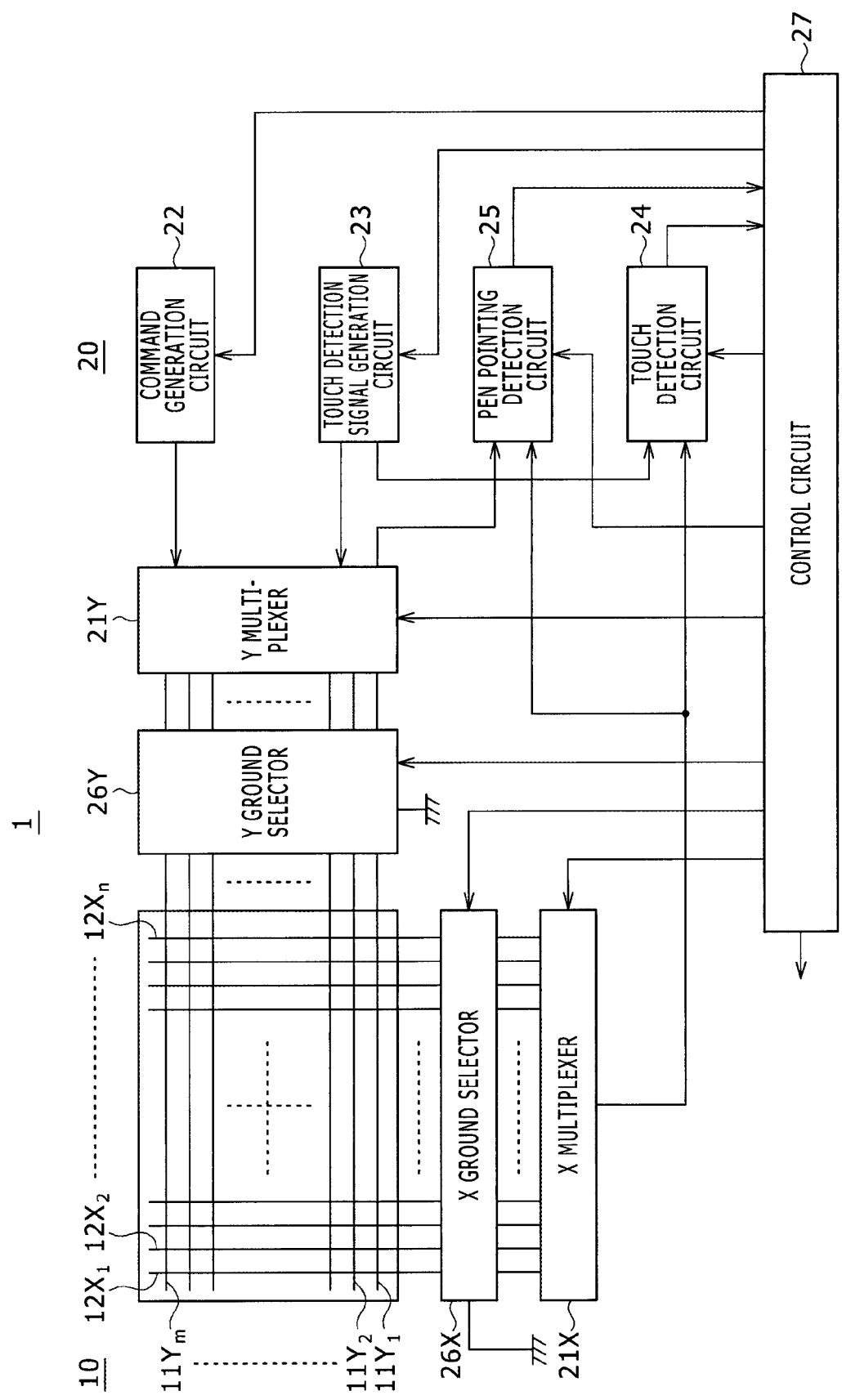
FIG. 2 is a block diagram illustrating a configuration example of the embodiment of the touch panel according to the present disclosure.

A description will be given next of a configuration example of the touch panel 1 according to the present embodiment. FIG. 2 is a diagram for describing a schematic configuration example of the touch panel 1 according to the present embodiment. The touch panel 1 in this example includes a so-called cross-point sensor 10. The cross-point sensor 10 can detect not only capacitive touch (hereinafter simply referred to as touch) with a pointer such as hand or finger 3 but also a position pointed to by the active stylus 4 (hereinafter referred to as a pen-pointed position).

In this example, the sensor 10 is formed by stacking a first conductor group 11, an insulating layer (not illustrated), and a second conductor group 12 from the bottom in this order. The first conductor group 11 includes first conductors $11Y_1$, $11Y_2$ and so on to $11Y_m$ (where m is an integer equal to or greater than 1) that extend in a first direction such as horizontally (x-axis direction) and are arranged parallel with a predetermined spacing therebetween.

On the other hand, the second conductor group 12 includes second conductors $12X_1$, $12X_2$ and so on to $12X_n$ (where n is an integer equal to or greater than 1) that extend in a second direction in the y-axis direction orthogonal to the direction of extension of the first conductors $11Y_1$, $11Y_2$ and so on to $11Y_m$. The second conductors are arranged parallel with a predetermined spacing therebetween.

It should be noted that the first conductors $11Y_1$ to $11Y_m$ will be referred to as the first conductors 11Y if it is not necessary to distinguish between the individual conductors. Similarly, the second conductors $12X_1$ to $12X_n$ will be referred to as the second conductors 12X if it is not necessary to distinguish between the individual conductors.

Thus, the touch panel 1 detects a position of in a position detection area defined by a sensor pattern pointed to by a pointer such as a hand or finger 3 or an active stylus 4. The sensor pattern is formed by arranging the first and second conductor groups 11 and 12 to intersect each other.

The position detection area of the sensor 10 of the touch panel 1 according to the present embodiment fits the size of the display screen 2D of the display device included in the electronic apparatus 2. The position detection area includes an input face 10S that is comparable in size to the display screen 2D. The position detection area is formed by the first and second conductor groups 11 and 12.

In the sensor 10 of the touch panel 1 according to the present embodiment, when a touch with the hand or finger 3 is detected, a transmission signal is supplied to the first conductor group 11 arranged in the first direction, and a signal is received from the second conductor group 2 arranged in a second direction. Further, when a position pointed to by the active stylus 4 is detected, signals are received from the respective first and second conductor groups 11 and 12. It should be noted that the operating principle of a cross-point capacitive position detection device and so on is described in detail in Japanese Patent Laid-Open Nos. 2011-3035, 2011-3036, and 2012-123599, patent application publications relating to the disclosures of the inventor of the present application.

The touch panel 1 according to the present embodiment includes the sensor 10 and a signal processing circuit 20 as illustrated in FIG. 2. The sensor 10 makes up the touch panel (position detection sensor). The signal processing circuit 20 is connected to the sensor 10. The signal processing circuit 20 includes Y and X multiplexers 21Y and 21X, a command generation circuit 22, a touch detection signal generation circuit 23, a touch detection circuit 24, a pen pointing detection circuit 25, Y and X ground selectors 26Y and 26X, and a control circuit 27. The Y and X multiplexers 21Y and 21X serve as input/output interfaces with the sensor 10.

The Y multiplexer 21Y is provided between the first conductor group 11 and the command generation circuit 22, the touch detection signal generation circuit 23, and the pen pointing detection circuit 25. The Y multiplexer 21Y changes, under control of the control circuit 27, connection between each of the plurality of first conductors 11Y that make up the first conductor group 11 and the command generation circuit 22, the touch detection signal generation circuit 23, and the pen pointing detection circuit 25.

The X multiplexer 21X is provided between the second conductor group 12 and the touch detection circuit 24 and the pen pointing detection circuit 25. The X multiplexer 21X changes, under control of the control circuit 27, connection between each of the plurality of second conductors 12X that make up the second conductor group 12 and the touch detection circuit 24 and the pen pointing detection circuit 25.

The command generation circuit 22 generates a command signal to be transmitted to the active stylus 4 via the first conductor group 11, supplying the signal to the Y multiplexer 21Y. The command signal includes, for example, a setup command that sets up a frequency used by the active stylus 4 on the active stylus 4. The command signal also includes, for example, a command that specifies when to send a position detection signal or writing pressure detection signal to the active stylus 4. Then, the command generation circuit 22 receives a control signal from the control circuit 27 and generates a command signal appropriate to the control signal, sending the command signal. In this example, a command signal from the command generation circuit 22 is supplied to the plurality of first conductors 11Y of the first conductor group 11 via the Y multiplexer 21Y.

The touch detection signal generation circuit 23 generates a touch detection signal on the basis of the control signal from the control circuit 27, supplying the touch detection signal to the Y multiplexer 21Y. In this example, a spread code that includes an orthogonal matrix such as Hadamard matrix is used as a touch detection signal. A touch detection signal is supplied to the plurality of first conductors 11Y of the first conductor group 11 via the Y multiplexer 21Y.

The touch detection circuit 24 has a function to detect a position of the sensor 10 pointed to by the hand or finger 3. That is, the capacitance changes between the first and second conductors 11Y and 12X at each intersection (cross-points) of the sensor pattern formed by arranging the plurality of first conductors 11Y and the plurality of second conductors 12X to intersect each other. Therefore, the touch detection circuit 24 detects the change in capacitance, thus detecting the touched position of the sensor 10.

In the present embodiment, a transmission signal (spread code in this example) is supplied from the touch detection signal generation circuit 23 to the first conductor group 11, thus acquiring a reception signal from the second conductors 12X via capacitance (mutual capacitance) between the first and second conductors 11Y and 12X. The cross-point touched with the hand or finger 3 is connected to the external ground via the human body, thus changing the capacitance (mutual capacitance). The touch detection circuit 24 senses, on the basis of this change in capacitance, a change in reception signal level from the second conductor 12X at that position, thus detecting the touched position. To detect a correlation level of the spread code from the reception signal, the touch detection circuit 24 is supplied with a signal (correlation calculation spread code) appropriate to the transmission signal (spread code) supplied to the first conductor group 11 from the touch detection signal generation circuit 23. Then, the touch detection circuit 24 supplies the detection result of the detected touched position to the control circuit 27.

The pen pointing detection circuit 25 is designed to detect a position of the sensor 10 pointed to by the active stylus 4. As will be described later, the active stylus 4 includes a transmission circuit 4S (refer to FIG. 1) and sends a signal from the transmission circuit 4S from an electrode provided at a pen tip. It should be noted that the transmission circuit 4S may include an oscillator. Alternatively, the transmission circuit 4S may generate a modulated signal from an oscillation signal of an oscillator. The pen pointing detection circuit 25 receives this signal from the active stylus 4 not only from the second conductor group 12 of the sensor 10 but also from the first conductor group 11 of the sensor 10. It should be noted that the active stylus 4 in this example receives a transmission signal from the touch panel 1 with the electrode at the pen tip as an antenna.

The pen pointing detection circuit 25 checks the reception signal level from the active stylus 4 for each of the first and second conductors 11Y and 12X making up the first and second conductor groups 11 and 12, respectively. The pen pointing detection circuit 25 detects the first and second conductors 11Y and 12X whose reception signal levels are high, detecting the position pointed to by the active stylus 4. Then, the pen pointing detection circuit 25 supplies, to the control circuit 27, the detection result of the position pointed to by the active stylus 4.

In this example, the Y ground selector 26Y is provided between the first conductor group 11 and the Y multiplexer 21Y, controlling coupling between each of the first conductors 11Y of the first conductor group 11 and the circuit ground of the touch panel 1 under control of the control circuit 27.

Here, coupling between the conductors and the circuit ground is not limited to direct connection between each of the conductors and the circuit ground and includes connection therebetween via a resistance or capacitance.

Figure 3:
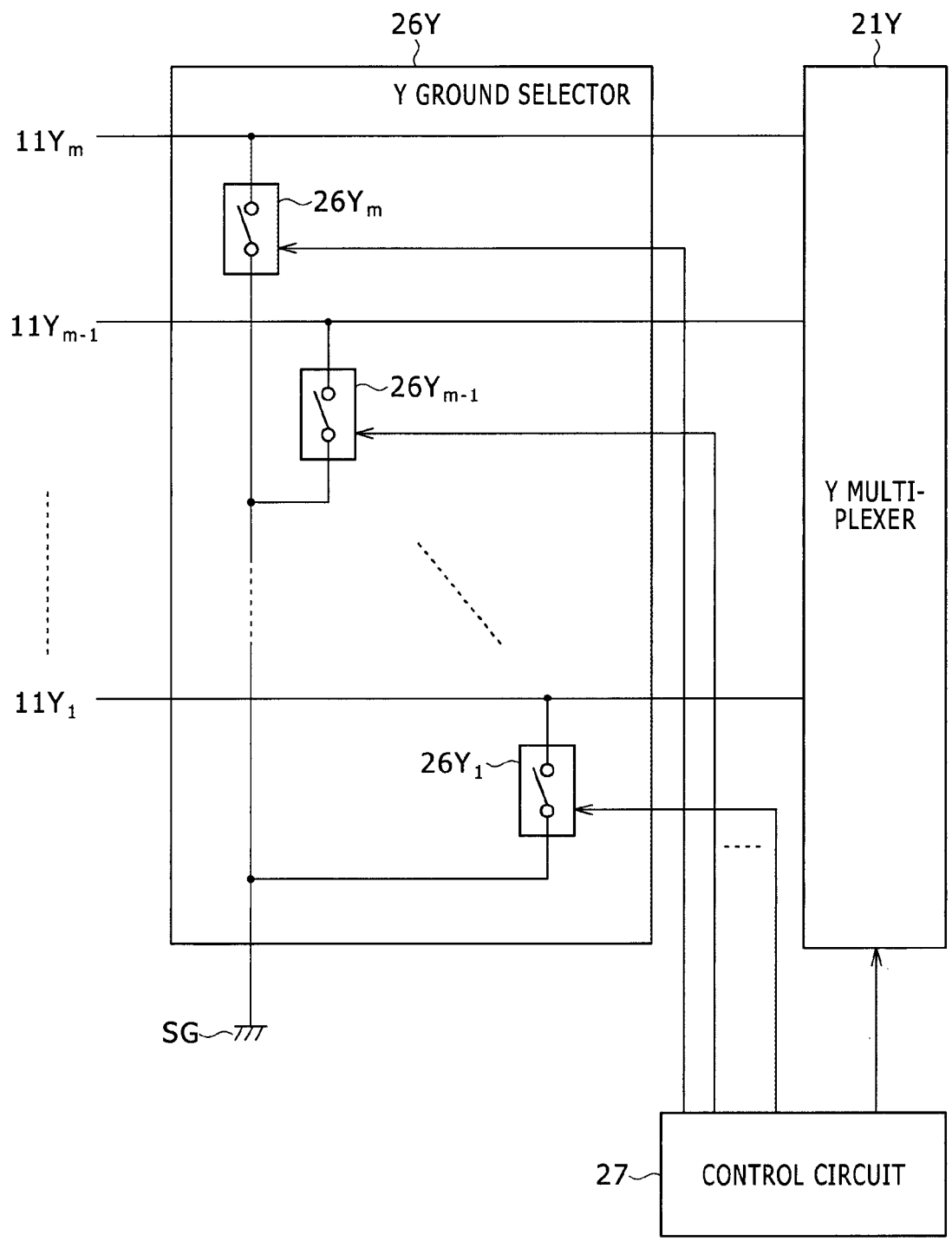
FIG. 3 is a diagram illustrating part of the configuration example of the embodiment of the touch panel according to the present disclosure.

FIG. 3 illustrates a configuration example of the Y ground selector 26Y. That is, each of the first conductors $11Y_1$ and so on to $11Y_{m-1}$ and $11Y_m$ making up the first conductor group 11 is not only connected to the Y multiplexer 21Y but also directly connected, in this example, to a circuit ground SG of the touch panel 1 via one of switching circuits $26Y_1$ and so on to $26Y_{m-1}$ and $26Y_m$. Then, an on/off state of each of the switching circuits $26Y_1$ and so on to $26Y_{m-1}$ and $26Y_m$ is changed by a control signal from the control circuit 27.

Figure 4:
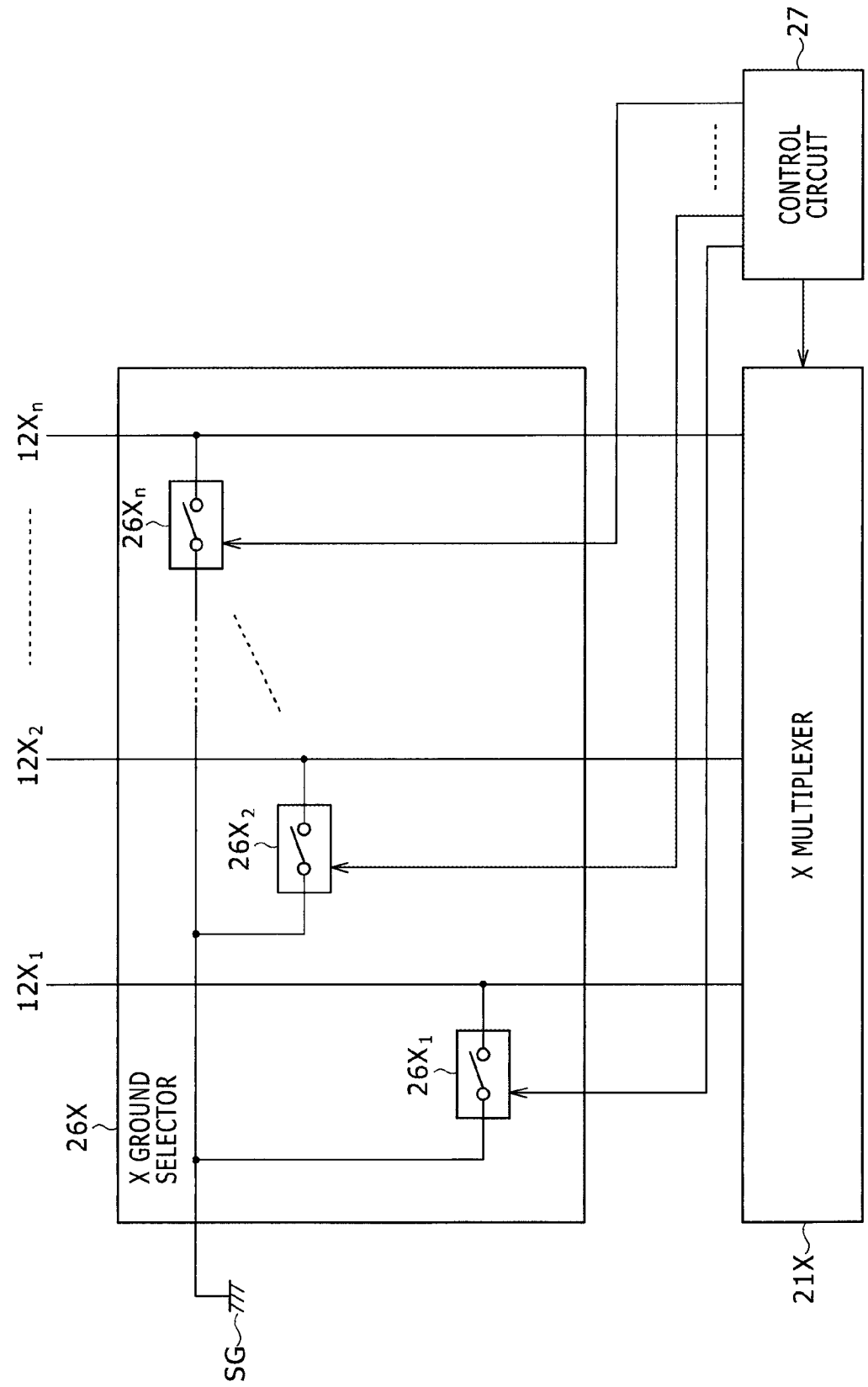
FIG. 4 is a diagram illustrating part of the configuration example of the embodiment of the touch panel according to the present disclosure.

FIG. 4 illustrates a configuration example of the X ground selector 26X. In this example, the ground selector 26X is provided between the second conductor group 12 and the X multiplexer 21X, controlling coupling between each of the second conductors 12X of the second conductor group 12 and the circuit ground SG of the touch panel 1 under control of the control circuit 27. That is, each of the second conductors $12X_1$, $12X_2$ and so on to $12X_n$ making up the second conductor group 12 is not only connected to the X multiplexer 21X but also directly connected, in this example, to the circuit ground SG of the touch panel 1 via one of switching circuits $26X_1$ and $26X_2$ and so on to $26X_n$. Then, the on/off state of each of the switching circuits switching circuits $26X_1$ and $26X_2$ and so on to $26X_n$ is changed by a control signal from the control circuit 27.

The control circuit 27 is designed to control the operation of the touch panel 1 as a whole. In this example, the control circuit 27 includes a microprocessor unit (MPU) and has function of a coupling control circuit that controls coupling between the conductors and the circuit ground.

The touch panel 1 according to the present embodiment handles uplink (transmission) to and downlink (reception) from the active stylus 4 in a time-divided manner. The touch panel 1 also detects a touch with the hand or finger 3 and a position pointed to by the active stylus 4 in a time-divided manner. The control circuit 27 manages this time division processing.

Figure 5:
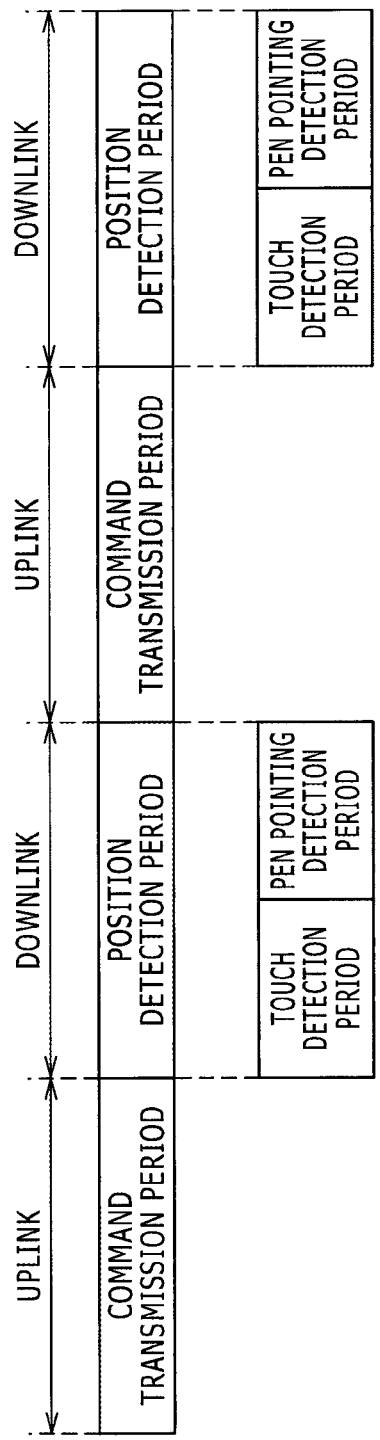
FIG. 5 is a diagram for describing operation of the embodiment of the touch panel according to the present disclosure.

That is, the touch panel 1 according to the present embodiment handles uplink and downlink periods alternately in a time-divided manner as illustrated in FIG. 5. Then, the uplink period is a command transmission period during which a command signal is transmitted from the command generation circuit 22 to the active stylus 4. On the other hand, the downlink period is a position detection period. The downlink period is a position detection period. The first half thereof is a touch detection period during which a touch on the touch panel 1 with the hand or finger 3 is detected, and the second half thereof is a pen pointing detection period during which a position pointed to by the active stylus 4 is detected.

During the command transmission period of the uplink period, the control circuit 27 controls the Y multiplexer 21Y such that a command signal from the command generation circuit 22 is supplied to each of the plurality of first conductors 11Y of the first conductor group 11 via the Y ground selector 26Y. At this time, the control circuit 27 controls the touch detection circuit 24 and the pen pointing detection circuit 25 to be inactive.

During the touch detection period in the first half of the position detection period of the downlink period, on the other hand, the control circuit 27 controls the Y multiplexer 21Y such that a touch detection signal (spread code in this example) from the touch detection signal generation circuit 23 is supplied to each of the first conductors 11Y of the first conductor group 11 via the Y ground selector 26Y. Then, during this touch detection period, the control circuit 27 controls the X multiplexer 21X such that a reception signal obtained for each of the plurality of second conductors 12X of the second conductor group 12 is supplied to the touch detection circuit 24. At this time, the control circuit 27 controls the command generation circuit 22 and the pen pointing detection circuit 25 to be inactive.

During this touch detection period, a touch detection signal (spread code in this example) from the touch detection signal generation circuit 23 is transmitted from the plurality of first conductors 11Y of the first conductor group 11 to the plurality of second conductors 12X of the second conductor group 12 by capacitive coupling therebetween.

The touch detection circuit 24 calculates correlation between the received touch detection signal (spread code in this example) obtained for each of the plurality of second conductors 12X of the second conductor group 12 that are output from the X multiplexer 21X and the position detection signal (correlation calculation spread code in this example) from the touch detection signal generation circuit 23. As a result, the touch detection circuit 24 detects a touch on a cross-point with the hand or finger 3 and where the level of the touch detection signal, a transmission signal, has declined, thus detecting the position touched with the hand or finger 3.

It should be noted that touch detection with a touch detection signal may be performed only once or repeated a plurality of times during this touch detection period.

During the pen pointing detection period in the second half of the position detection period of the downlink period, on the other hand, the control circuit 27 controls the Y multiplexer 21Y such that a signal obtained for each of the plurality of first conductors 11Y of the first conductor group 11 is supplied to the pen pointing detection circuit 25. The control circuit 27 also controls the X multiplexer 21X such that a reception signal obtained for each of the plurality of second conductors 12X of the second conductor group 12 is supplied to the pen pointing detection circuit 25. At this time, the control circuit 27 controls the command generation circuit 22, the touch detection signal generation circuit 23, and the touch detection circuit 24 to be inactive.

During this pen pointing detection period, a position detection signal transmitted from the active stylus 4 is detected by each of the first and second conductor groups 11 and 12. That is, the pen pointing detection circuit 25 detects the reception signal level from the active stylus 4, a signal output from the Y multiplexer 21Y and obtained for each of the plurality of first conductors 11Y of the first conductor group 11, first. The pen pointing detection circuit 25 detects the plurality of first conductors 11Y whose reception level is higher than a predetermined value, thus detecting the position of the sensor 10 in they direction pointed to by the active stylus 4 from the plurality of first conductors 11Y.

Further, the pen pointing detection circuit 25 detects the reception signal level of the position detection signal from the active stylus 4, a signal output from the X multiplexer 21X and obtained for each of the plurality of second conductors 12X of the second conductor group 12. The pen pointing detection circuit 25 detects the plurality of second conductors 12X whose reception level is higher than a predetermined value, thus detecting the position of the sensor 10 in the x direction pointed to by the active stylus 4 from the plurality of second conductors 12X.

Then, the pen pointing detection circuit 25 detects the coordinate position of the sensor 10 pointed to by the active stylus 4 from the detected x- and y-positions.

Then, in the present embodiment, when the control circuit 27 detects a touch on the touch panel 1 with the hand or finger 3 during the touch detection period, the control circuit 27 switches between the switching circuits $26Y_1$ to $26Y_m$ of the Y ground selector 26Y and the switching circuits $26X_1$ to $26X_n$ of the X ground selector 26X such that at least one of the first conductors 11Y and/or second conductors 12X included in the touched position is coupled with circuit ground SG during the subsequent command transmission period.

Figure 6:
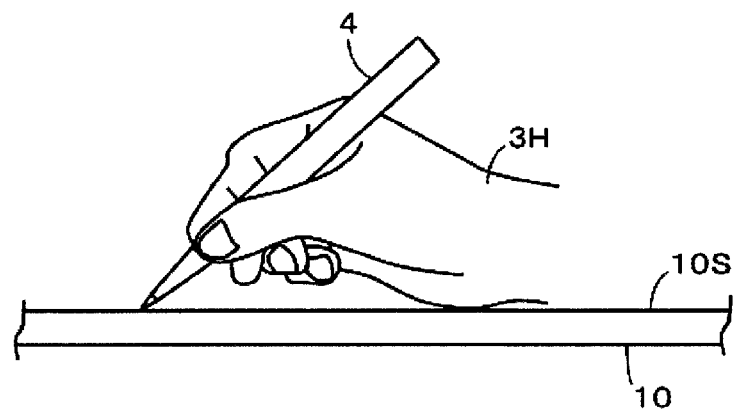
FIG. 6 is a diagram used to describe operation of the embodiment of the touch panel according to the present disclosure.

That is, if the user holds the active stylus 4 and points to a position of the input face 10S of the sensor 10 with the active stylus 4 as illustrated, for example, in FIG. 6, part of a palm of a user's hand 3H often touches the input face 10S. The touch detection circuit 24 of the touch panel 1 detects the position touched with part of a palm of the user's hand 3H on the sensor 10 as a shaded area AH illustrated, for example, in FIG. 7, notifying the control circuit 27 of information of touch detection result.

During the subsequent command transmission period, the control circuit 27 controls, on the basis of the information of the touch detection result from the touch detection circuit 24, the Y ground selector 26Y and/or the X ground selector 26X such that the first conductor $11Y_4$ and the second conductor $12X_{n-7}$ at the center of the area AH, for example, that are likely in firmer contact with the input face 10S of the sensor 10 in the area AH are coupled with the circuit ground SG. That is, the control circuit 27 decides on the detected touched position area, identifying, on the basis of the decided touched position area, conductors capacitively coupled with the hand or finger 3 of user and that can be more firmly coupled with the external ground via the human body. The control circuit 27 performs control such that the identified conductors are coupled with the circuit ground SG.

Figure 8:
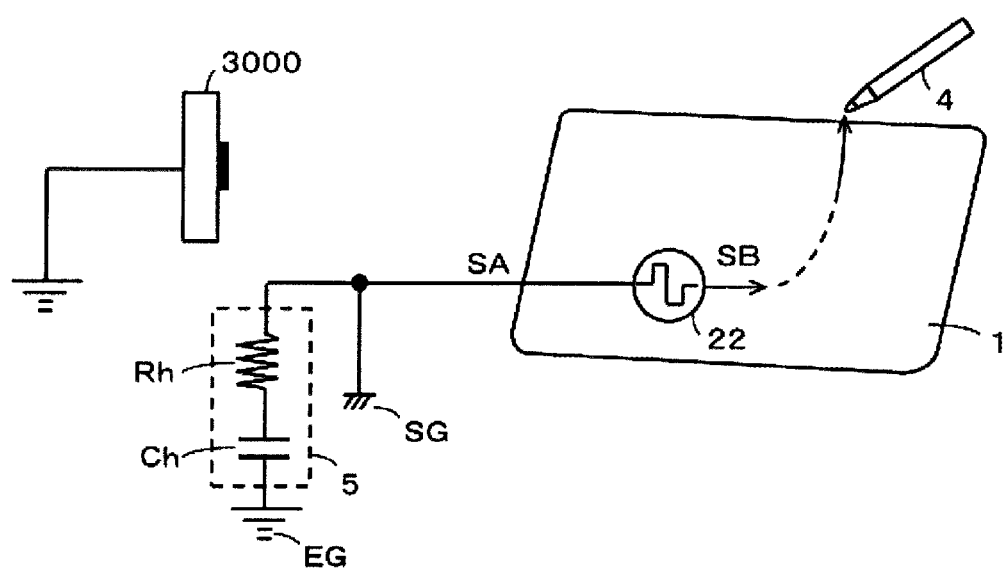
FIG. 8 is a diagram for describing an effect in the embodiment of the touch panel according to the present disclosure.

Thus, a predetermined number of conductors corresponding to the touched position of the touch panel 1 with the hand or finger 3, detected during the touch detection period, are coupled with the circuit ground SG during the subsequent command transmission period. As illustrated in FIG. 8, therefore, a circuit ground side of the touch panel 1 is coupled with an external ground EG via a human body 5 that is equivalent to the resistance Rh and the capacitance Ch. This makes it possible to transmit a command signal transmitted from the touch panel 1 to the active stylus 4 with no decline in its strength during the uplink command transmission period.

Then, as a result of coupling with the external ground EG, the circuit ground SG of the touch panel 1 is firmly coupled with the human body 5 that is coupled with the external ground. This allows signals that wrap around from the touch panel to the active stylus 4 via the human hand to flow to the external ground EG, thus reducing or preventing decline in command signal strength received by the active stylus 4 and signal inversion.

It should be noted that, in the above example, one each of the first conductors 11Y and/or second conductors 12X included in the touched position is coupled with the circuit ground SG during the command transmission period. However, the number of conductors to be coupled is not limited thereto. All the first and second conductors 11Y and 12X included in the detected touched position may be coupled with the circuit ground. Alternatively, some of the plurality of conductors may be coupled with the circuit ground. When some of the plurality of conductors are coupled with the circuit ground, the control circuit 27 identifies the plurality of conductors to be coupled with the circuit ground SG on the basis of the detected touched area pattern in the same manner as described above.

Further, although the first conductors 11Y are used to transmit command signals during the command transmission period, it is difficult for those coupled with the circuit ground SG to externally send transmission signals. For this reason, only the plurality of second conductors 12X of the second conductor group 12 may be used for coupling with the circuit ground SG without using the plurality of first conductors 11Y of the first conductor group 11 for the same purpose.

[Example of Operation Flow of Control Circuit 27 of Touch Panel 1]

Figure 9:
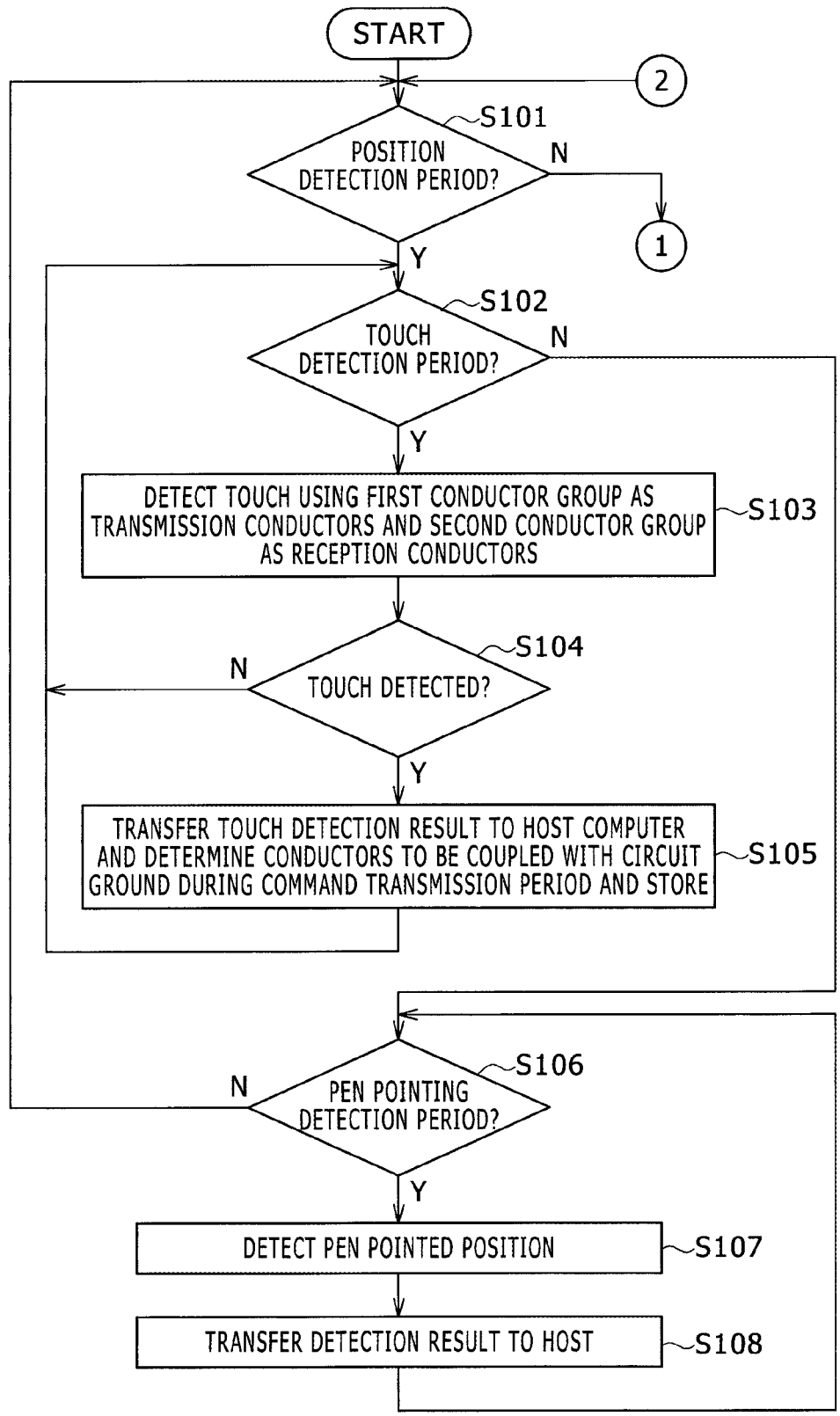
FIG. 9 is a diagram illustrating part of a flowchart for describing an example of processing operation of the embodiment of the touch panel according to the present disclosure.

A description will be given below of an example of operation flow of the control circuit 27 of the touch panel 1 according to the present embodiment with reference to the flowcharts illustrated in FIGS. 9 and 10.

The control circuit 27 decides whether or not the position detection period is underway (step S101). When the control circuit 27 decides that the position detection period is underway, the control circuit 27 decides whether or not the touch detection period is underway (step S102). When the control circuit 27 decides that the touch detection period is underway in step S102, the control circuit 27 supplies a touch detection signal from the touch detection signal generation circuit 23 to the plurality of first conductors 11Y of the first conductor group 11 and receives a reception signal for the touch detection signal from each of the plurality of second conductors 12X of the second conductor group 12 as described above, thus calculating correlation therebetween and controlling detection of a touch with the hand or finger 3 (step S103).

Then, the control circuit 27 decides whether or not a touch with the hand or finger 3 was detected as a result of touch detection in step S103 (step S104). If the control circuit 27 decides that a touch with the hand or finger 3 has not been detected, the control circuit 27 returns to step S102 to repeat the processing from step S102 onward.

On the other hand, when the control circuit 27 decides in step S104 that a touch with the hand or finger 3 was detected, the control circuit 27 detects the touched position (touched area) of the sensor 10 and transfers it to the host computer of the electronic apparatus. The control circuit 27 determines the one, plurality, or all of the first conductors 11Y and/or second conductors 12X at the touched position as conductors to be coupled with the circuit ground SG during the command transmission period, storing these conductors in a buffer memory (step S105). Following step S105, the control circuit 27 returns to step S102 to repeat the processing from step S102 onward.

Then, if the control circuit 27 decides in step S102 that the touch detection period is not underway (or the touch detection period has ended), the control circuit 27 decides whether or not the pen pointing detection period is underway (step S106). When the control circuit 27 decides in step S106 that the pen pointing detection period is underway, the control circuit 27 uses all the first and second conductors 11Y and 12X as reception conductors as described above and performs control such that the position of the sensor 10 pointed to by the active stylus 4 is detected on the basis of position detection signals received from the active stylus 4 (step S107).

Then, the control circuit 27 transfers the pen pointed position detection result on the sensor 10 to the host computer of the electronic apparatus (step S108). Following step S108, the control circuit 27 returns to step S106 to repeat the processing from step S106 onward. Then, if the control circuit 27 decides in step S106 that the pen pointing detection period is not underway (or the pen pointing detection period has ended), the control circuit 27 returns to step S101 to repeat the processing from step S101 onward.

Figure 10:
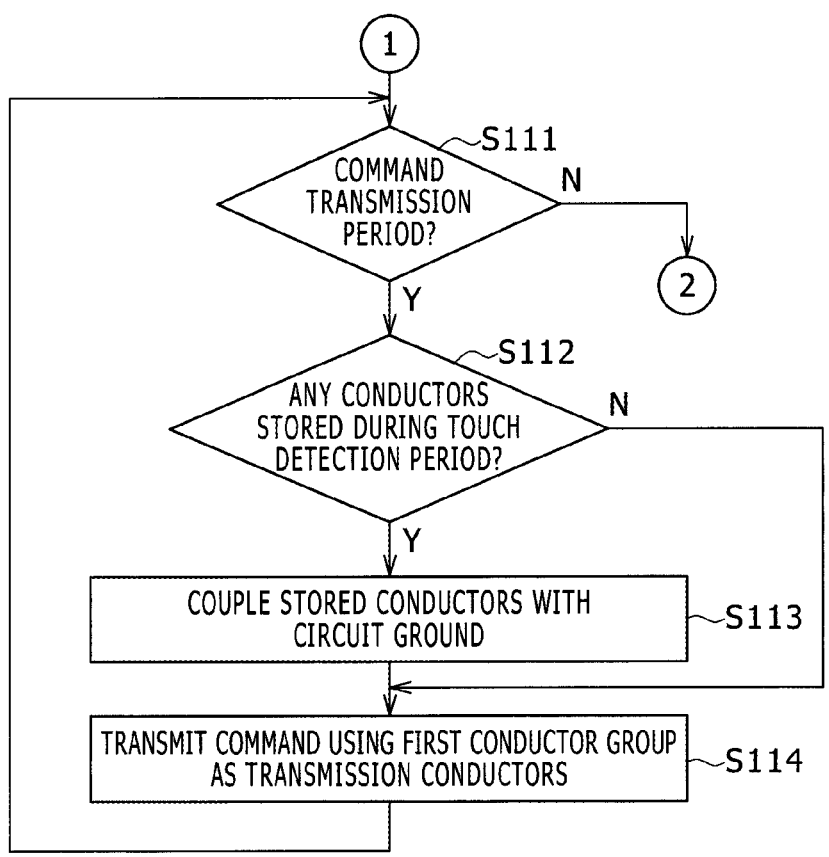
FIG. 10 is a diagram illustrating part of the flowchart for describing the example of processing operation of the embodiment of the touch panel according to the present disclosure.

If the control circuit 27 decides in step S101 that the position detection period is not underway (or the position detection period has ended), the control circuit 27 decides whether or not the command transmission period is underway (step S111 in FIG. 10). If the control circuit 27 decides in step S111 that the command transmission period is not underway (or the command transmission period has ended), the control circuit 27 returns to step S101 to repeat the processing from step S101 onward.

When the control circuit 27 decides in step S111 that the command transmission period is underway, the control circuit 27 decides whether or not the conductors to be coupled with the circuit ground SG during the touch detection period are stored (step S112). When the control circuit 27 decides in step S112 that the conductors to be coupled with the circuit ground SG are stored, the control circuit 27 controls the first conductors 11Y and/or second conductors 12X such that the stored conductors are coupled with the circuit ground SG (step S113).

Then, the control circuit 27 performs control such that a command signal is transmitted from the plurality of conductors 11Y of the first conductor group 11 (step S114). If the control circuit 27 decides in step S112 that the conductors to be coupled with the circuit ground SG are not stored, the control circuit 27 proceeds to step S114 and performs control such that a command signal is transmitted from the plurality of conductors 11Y of the first conductor group 11.

Then, following step S114, the control circuit 27 returns to step S111 to repeat the processing from step S111 onward.

Modification Example of Above Embodiment

In the above embodiment, command transmission processing, touch detection processing, and pen pointing detection processing to the active stylus 4 are handled in a time-divided manner. However, the embodiment is not limited to time-divided processing, frequency multiplexing processing using a different frequency for each of the processing tasks or multiplexing processing using spread code may be employed for simultaneous parallel processing. Alternatively, time-division processing and frequency multiplexing processing or multiplexing processing using spread code may be used in combination as necessary.

In this case, if simultaneous parallel processing is considered, for example, by means of frequency multiplexing processing, a plurality of signals at different frequencies may be used as illustrated in FIGS. 11A to 11C. For example, a frequency f1 is assigned to a command signal, a frequency f2 ($\neq$f1) to a touch detection signal, and a frequency f3 ($\neq$f1$\neq$f2) to a pen pointing detection signal.

Then, a band-pass filter is provided for the output signal of the operational amplifier of the reception circuit of the active stylus 4 to extract a band component centered around the frequency f1. Further, a band-pass filter is provided on an input side of the reception signal of the touch detection circuit 24 of the touch panel 1 to extract a band component centered around the frequency f2. Still further, a band-pass filter is provided on an input side of the pen pointing detection circuit 25 to extract a band component centered around the frequency f3.

Thus, if command signal transmission processing and pen pointing detection processing are performed simultaneously in parallel by means of frequency multiplexing processing or multiplexing processing using spread code, command signal transmission processing and detection of a position pointed to by the active stylus 4 take place in parallel. As a result, it is necessary to ensure that pen pointing detection processing is not affected to the extent possible in selecting the conductors to be coupled with the circuit ground SG.

Figure 7:
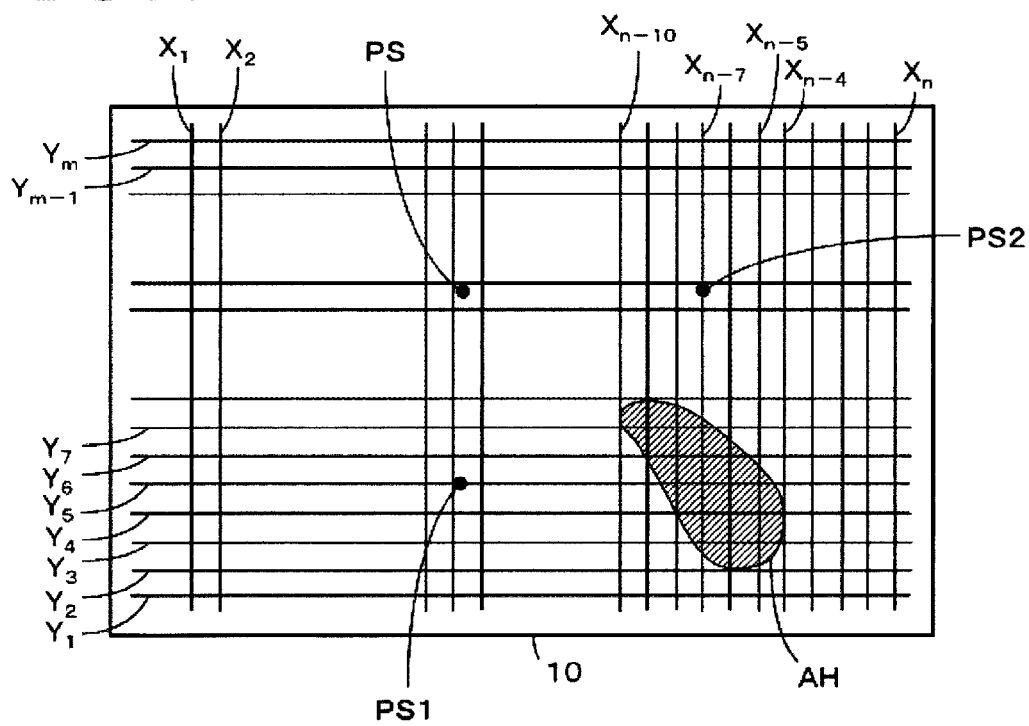
FIG. 7 is a diagram for describing a touch detection state of a sensor in the embodiment of the touch panel according to the present disclosure.

That is, when the palm-touched area AH as illustrated, for example, in FIG. 7 is detected by touch detection processing, and when the pen-pointed position detected by the pen pointing detection processing is located, for example, at a position PS in FIG. 7, the first and second conductors 11Y and 12X near the position PS are different from those passing through the area AH. In this case, therefore, pen pointing detection is not affected irrespective of which of the first and second conductors 11Y and 12X passing through the area AH is coupled with the circuit ground.

However, when the pen-pointed position detected by the pen pointing detection processing is located, for example, at a position PS1 illustrated in FIG. 7, the first conductors 11Y near the position PS1 pass through the area AH. Therefore, if these first conductors 11Y are coupled with the circuit ground SG, it is difficult to detect the pen-pointed position. For this reason, in this case, the first conductors 11Y passing through the area AH are not coupled with the circuit ground SG. Instead, the second conductors 12X passing through the area AH are coupled with the circuit ground SG.

On the other hand, when the pen-pointed position detected by the pen pointing detection processing is located, for example, at a position PS2 illustrated in FIG. 7, the second conductors 12X near the position PS2 pass through the area AH. Therefore, if these second conductors 12X are coupled with the circuit ground SG, it is difficult to detect the pen-pointed position. For this reason, in this case, the second conductors 12X passing through the area AH are not coupled with the circuit ground SG. Instead, the first conductors 11Y passing through the area AH are coupled with the circuit ground SG.

That is, if command signal transmission processing and pen pointing detection processing are performed simultaneously in parallel by means of frequency multiplexing processing or multiplexing processing using spread code, the control circuit 27 selects the conductors that do not affect pen pointing detection from relationship between a touch-detected area obtained from the touch detection result and a pen pointing-detected area from the pen pointing detection result before coupling the first conductors 11Y and/or second conductors 12X with the circuit ground SG. Then, the control circuit 27 determines the conductors to be coupled with the circuit ground SG on the basis of the selection as described above.

In the frequency multiplexing processing illustrated in FIGS. 11A to 11C, different frequencies are used for touch detection and pen pointing detection signals. However, detection of a touched position in touch detection processing by capacitive coupling and detection of a pen-pointed position in pen pointing detection processing differ in their position detection method. Therefore, the same frequency may be used for touch detection and pen pointing detection signals as illustrated in FIGS. 12A and 12B.

That is, touch detection is conducted by detecting a conductor the reception level of whose received touch detection signal is lower than a predetermined threshold Vth1 as illustrated in FIG. 12A. On the other hand, pen pointing detection is conducted by detecting a conductor the reception level of whose received position detection signal is higher than a predetermined threshold Vth2 as illustrated in FIG. 12B. Therefore, even if the touch detection and pen pointing detection signals are at the same frequency, touch detection and pen pointing detection can be conducted independently of each other.

For this reason, as illustrated in FIGS. 13A to 13C, in this case, the frequency f1 can be assigned to a command signal, and the frequency f2 ($\neq$f1) to touch detection and pen pointing detection signals.

Next, in the above embodiment, the first conductors 11Y and/or second conductors 12X used for touch detection and pen pointing detection on the sensor 10 are those to be coupled with the circuit ground SG. However, the conductors to be coupled with the circuit ground SG may be those other than the first conductors 11Y and/or second conductors 12X used for touch detection and pen pointing detection.

Figure 14:
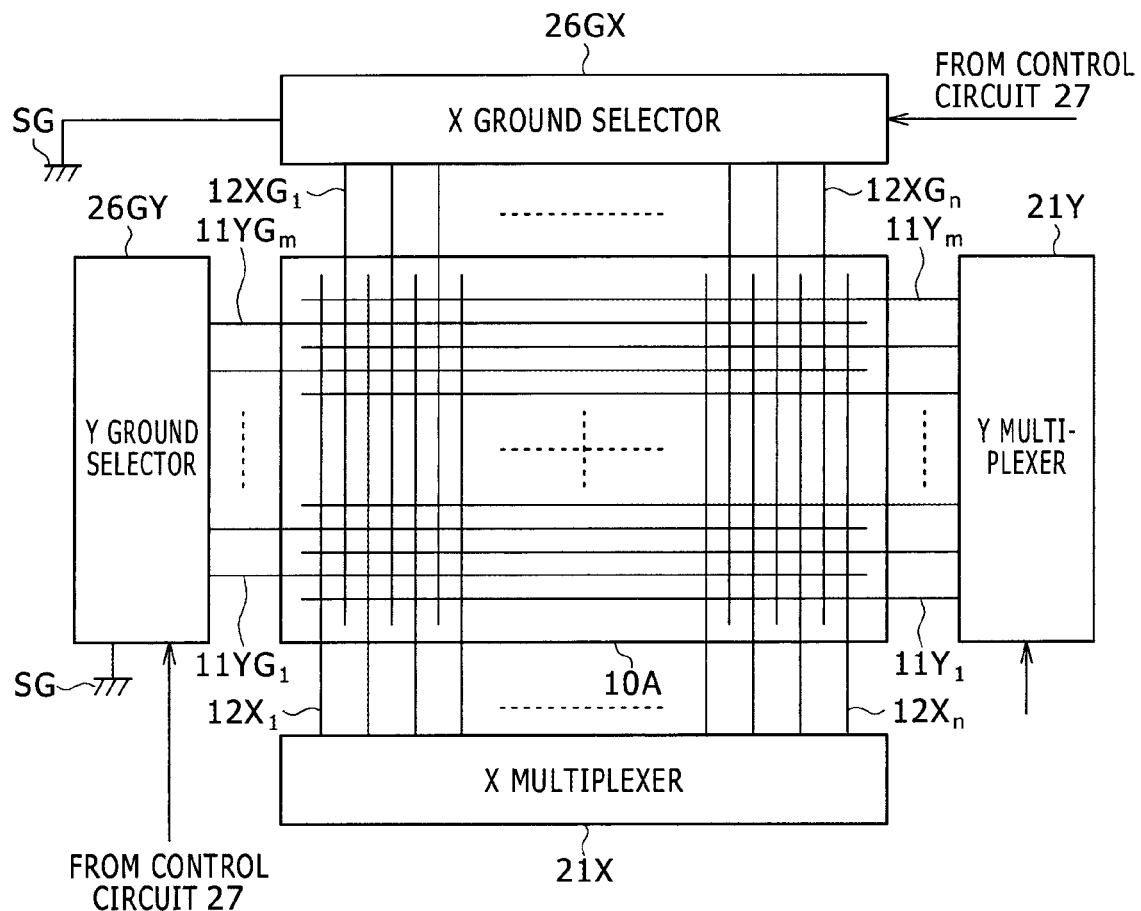
FIG. 14 is a diagram used to describe another embodiment of the touch panel according to the present disclosure.

FIG. 14 illustrates an example thereof. That is, one of third conductors $11YG_1$ to $11YG_m$ are formed between each two adjacent ones of the plurality of first conductors 11Y, and one of fourth conductors $12XG_1$ to $12XG_m$ are formed between each two adjacent ones of the plurality of second conductors 12X on a sensor 10A in the example of FIG. 14 for coupling with the circuit ground SG. In this case, the third conductors $11YG_1$ to $11YG_m$ and the fourth conductors $12XG_1$ to $12XG_m$ are made of a light-transmitting conductor as are the first and second conductors 11Y and 12X.

Then, the third conductors $11YG_1$ to $11YG_m$ are connected to a Y ground selector 26GY, and the fourth conductors $12XG_1$ to $12XG_m$ to an X ground selector 26GX. The Y ground selector 26GY can couple, under control of the control circuit 27, each of the third conductors $11YG_1$ to $11YG_m$ with the circuit ground SG via a switching circuit as does the Y ground selector 26Y illustrated in FIG. 3. Further, the X ground selector 26GX can couple, under control of the control circuit 27, each of the fourth conductors $12XG_1$ to $12XG_n$ with the circuit ground SG via a switching circuit as does the X ground selector 26X illustrated in FIG. 4.

In this case, the control circuit 27 is aware of the positional relationship between each of the third conductors $11YG_1$ to $11YG_m$ and each of the first conductors $11Y_1$ to $11Y_m$ and that between each of the fourth conductors $12XG_1$ to $12XG_n$ and each of the second conductors $12X_1$ to $12X_n$. This makes it possible for the control circuit 27 to detect the third and fourth conductors 11YG and 12XG near the first and second conductors 11Y and 12X on which a touch with the user's hand or finger 3 was detected, thus allowing these conductors to be selected as those to be coupled with the circuit ground SG. It should be noted that, in the description of the present specification, the third conductors $11YG_1$ to $11YG_m$ will be denoted as the third conductors 11YG if it is not necessary to distinguish between the individual conductors, and that the fourth conductors $12XG_1$ to $12XG_n$ will be denoted as the fourth conductors 12XG if it is not necessary to distinguish between the individual conductors.

In the example illustrated in FIG. 14, the control circuit 27 performs control such that the third conductors 11YG and/or fourth conductors 12XG adjacent to the first conductors 11Y and/or second conductors 12X that are included in the position (area) on which a touch was detected are coupled with the circuit ground.

Therefore, it is also possible to keep, to a minimum, a decline in signal strength transmitted to the active stylus 4 on the touch panel in the example of FIG. 14 as on the touch panel according to the above embodiment. At the same time, it is possible to reduce or prevent decline in signal strength received by the active stylus 4 and signal inversion.

Then, in the example illustrated in FIG. 14, the conductors to be coupled with the circuit ground SG are the third conductors 11YG and/or fourth conductors 12XG that are not used for transmission of a command or detection of a touched or pen-pointed position. Therefore, the touch panel 1 in the example of FIG. 14 has an advantageous effect in that the conductors at a touched position of the sensor 10A can be coupled with the circuit ground SG independently of command transmission, touched position detection, and pen-pointed position detection.

In the example of FIG. 14 described above, the third and fourth conductors 11YG and 12XG to be coupled with the circuit ground SG are formed on the same sensor substrate as for the first and second conductors 11Y and 12X. This makes it necessary to form the third and fourth conductors 11YG and 12XG between the adjacent first and adjacent second conductors 11Y and 12X, resulting in a narrow pitch between the conductors and leading to difficulty in manufacturing the sensor 10A.

Figure 15:
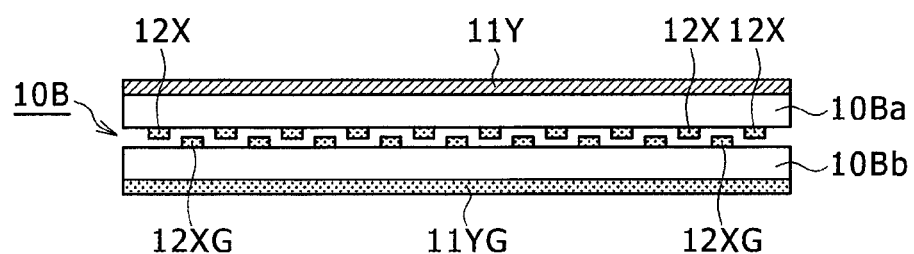
FIG. 15 is a diagram used to describe another embodiment of the touch panel according to the present disclosure.

The example illustrated in FIG. 15 is an example of improvement to the problem with the example illustrated in FIG. 14. That is, a sensor 10B in the example of FIG. 15 has two layers of sensor substrates 10Ba and 10Bb attached to each other. In this example, the plurality of first conductors 11Y are formed on a front face of the sensor substrate 10Ba, and the plurality of second conductors 12X on a rear face thereof. Further, the plurality of fourth conductors 12XG are formed on a front face of the sensor substrate 10Bb, and the plurality of third conductors 11YG on a rear face thereof. The sensor 10B is identical to the example illustrated in FIG. 14 in all other respects.

In the example illustrated in FIG. 15, two different substrates, i.e., the sensor substrate 10Ba on which the first and second conductors 11Y and 12X are formed for command signal transmission and touch detection and pen pointing detection and the sensor substrate 10Bb on which the third and fourth conductors 11YG and 12XG to be coupled with the circuit ground SG, are used. This prevents reduction in pitch between the conductors, thus providing improvement to the difficulty involved in forming the conductors.

Further, rather than forming a plurality of conductors to be coupled with the circuit ground SG on the substrate 10Bb, a substrate different from the sensor substrate 10Ba as illustrated in FIG. 15, a uniform conductor (a light-transmitting conductor in this example) may be formed over the entire surface of one face of the substrate 10Bb. In this case, it is only necessary to connect the conductor, formed over the entire surface of the substrate 10Bb, to the circuit ground via a single switching circuit and switch the single switching circuit with the control circuit 27. Then, in this case, when a touch on the first and second conductors 11Y and 12X formed on the sensor substrate 10Ba with the user's hand or finger is detected, the user's hand or finger is capacitively coupled with the conductor formed over the entire surface of one face of the substrate 10Bb. For this reason, it is only necessary to switch on the single switching circuit irrespective of the position touched with the user's hand or finger such that the conductor formed over the entire surface of the substrate 10Bb is coupled with the circuit ground. That is, in this case, it is not necessary for the control circuit 27 to identify the conductors to be coupled with the circuit ground by detecting where the touched position is.

Next, the touch panel sensor described above has a plurality of stripe-shaped conductors arranged such that they intersect each other in the y and x directions. The conductors arranged on the sensor are not limited to stripe-shaped conductors.

Figure 16:
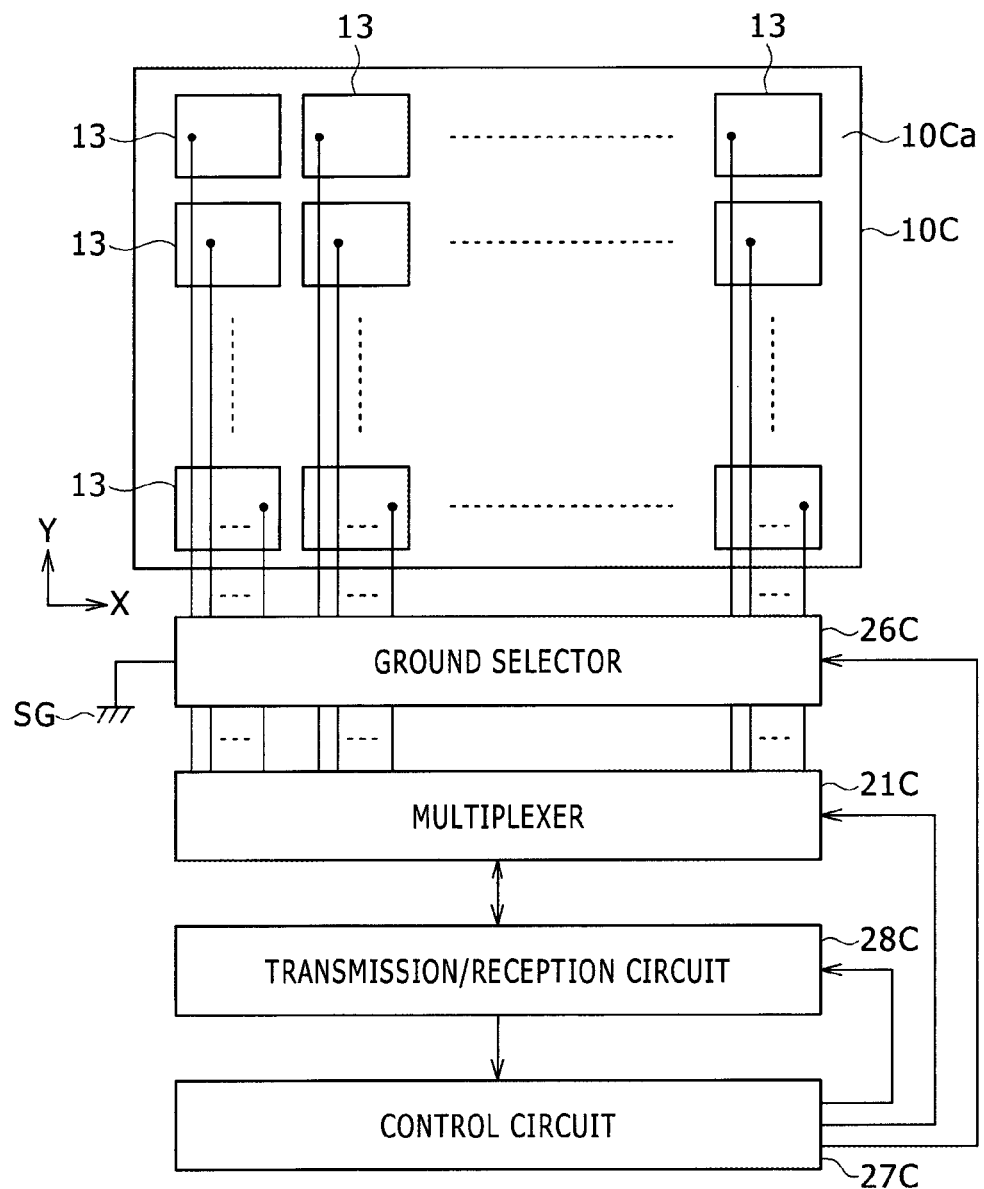
FIG. 16 is a diagram for describing a configuration example of another embodiment of the touch panel according to the present disclosure.

A sensor 10C in the example of FIG. 16 has a plurality of conductor pieces 13 of a predetermined shape, and in this example, rectangular conductor pieces 13, arranged in each of the y and x directions on a sensor substrate 10Ca. Then, all the plurality of conductor pieces 13 are connected to a multiplexer 21C via a ground selector 26C.

The ground selector 26C connects each of the plurality of conductor pieces 13 to the multiplexer 21C in an 'as-is' manner and to the circuit ground SG via a switching circuit as do the Y and X ground selectors 26Y and 26X illustrated respectively in FIGS. 3 and 4. The switching circuit of the ground selector 26C provided for each of the conductor pieces 13 is switched by a control signal from a control circuit 27C.

The multiplexer 21C is connected to a transmission/reception circuit 28C that includes circuits similar to the command generation circuit 22, the touch detection signal generation circuit 23, the touch detection circuit 24, and the pen pointing detection circuit 25 illustrated in FIG. 2. In this example, the multiplexer 21C selects, in response to a control signal from the control circuit 27C, the conductor pieces 13 to be used in a time-divided manner during each of the command transmission period and the touch detection and pen pointing detection periods of the position detection period as illustrated in FIG. 5.

The transmission/reception circuit 28C performs the same processing operation as described in the above embodiment using the circuits similar to the command generation circuit 22, the touch detection signal generation circuit 23, the touch detection circuit 24, and the pen pointing detection circuit 25. It should be noted, however, that touch detection and pen-pointed position detection are performed for each of the conductor pieces 13. Then, touch detection and pen pointing detection results of the transmission/reception circuit 28C are supplied to the control circuit 27C in this example.

The control circuit 27C detects the plurality of conductor pieces 13 touched with the hand or finger 3 on the basis of the touch detection result from the transmission/reception circuit 28C, thus selecting, from among the conductor pieces 13, those to be coupled with the circuit ground SG. Then, when a command signal is sent from the transmission/reception circuit 28C, the control circuit 27C generates a control signal to switch on the selected switching circuits, supplying the signal to the ground selector 26C.

In the example of FIG. 16, therefore, it is also possible to reduce or prevent decline in command signal strength transmitted to the active stylus 4 and reduce or prevent decline in command signal strength received by the active stylus 4 and signal inversion.

Then, in the example of FIG. 16, in particular, the conductor pieces 13 can be coupled with the circuit ground SG on a piece-by-piece basis. As a result, it is possible to minimize the conductor portion that does not contribute to command signal transmission because of coupling with the circuit ground SG during such transmission.

It should be noted that frequency multiplexing processing may be used for the touch panel illustrated in FIG. 16 rather than time division processing.

Other Embodiment and Modification Example

It should be noted that the touch panel sensor has a plurality of conductors arranged in the first and second directions (x and y directions) in the above embodiment. However, the touch panel sensor may have a plurality of conductors arranged only in one of the two directions.

It should be noted that although a touch detection method using spread code has been described in the above embodiment, the present disclosure is not limited thereto. Instead, it is needless to say that other known touch detection methods are also applicable.

It should be noted that the electronic apparatus 2 is driven by a battery in the example of the touch panel according to the above embodiment. However, the present disclosure is also effective even for the electronic apparatus 2 driven by a commercial AC power supply to reduce signal wraparound from the touch panel to the active stylus.

On the other hand, it is not necessary to stabilize the circuit ground of the touch panel by coupling it with an external ground as described earlier when the touch panel is connected to an AC adapter and driven by a commercial AC power supply. For this reason, if prime importance is placed on stabilization of the circuit ground of the touch panel by coupling it with an external ground, and if the touch panel is used for an electronic apparatus that can run both on AC adapter and battery, a circuit may be provided to decide whether the AC adapter or battery is currently used as a power supply such that coupling with the circuit ground is controlled only when the touch panel is driven by the battery.

It should be noted that it is possible to reduce or prevent decline in command signal strength in the same manner as described above even if the touch panel according to the present disclosure transmits a command signal to a device other than an active stylus by capacitive coupling.

Figure 17:
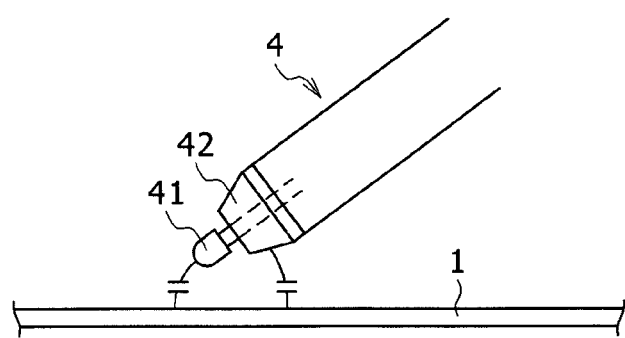
FIG. 17 is a diagram for describing an example of an active stylus used together with the touch panel according to the present disclosure.
Figure 18:
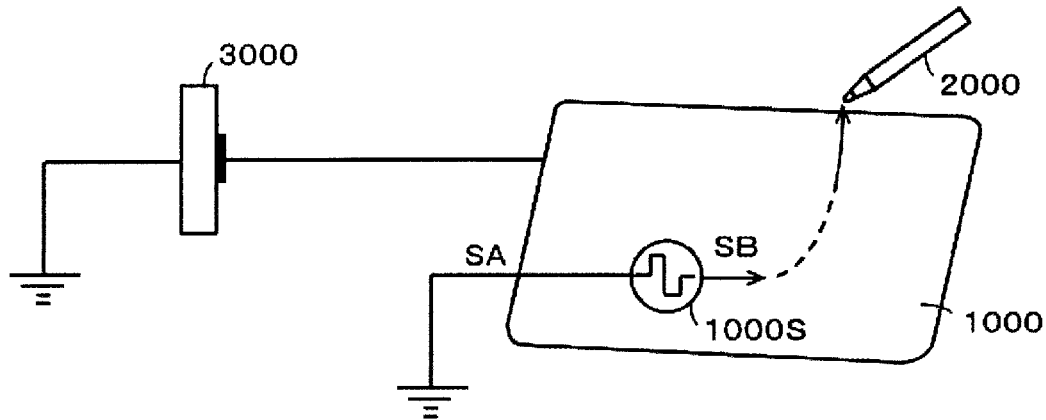
FIG. 18 is a diagram for describing a state in which a transmission signal is sent from the touch panel to the active stylus by capacitive coupling.
Figure 20:
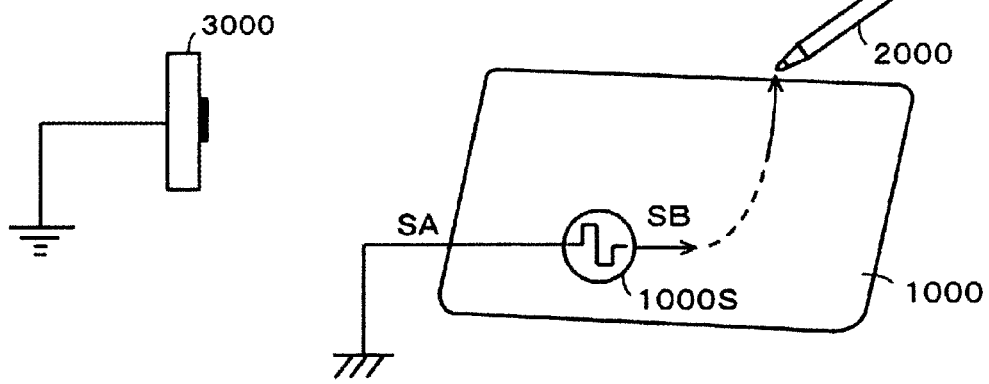
FIG. 20 is a diagram for describing a state in which a transmission signal is sent from the touch panel to the active stylus by capacitive coupling.
Figure 22:
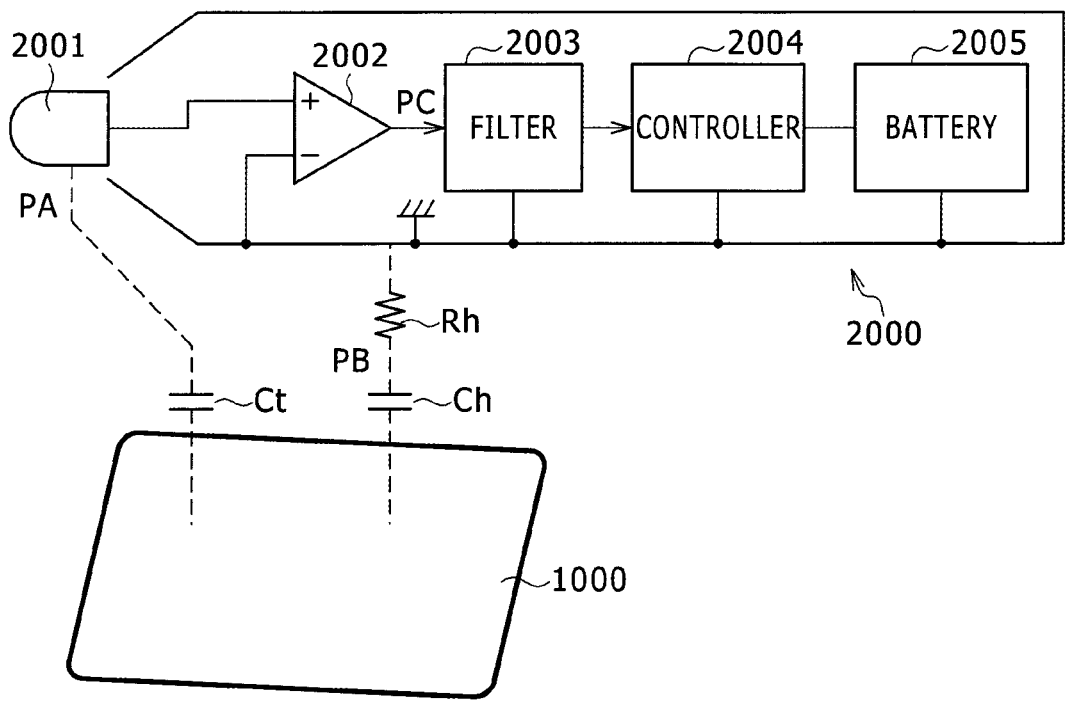
FIG. 22 is a diagram for describing a state in which a transmission signal is sent from the touch panel to the active stylus by capacitive coupling.
Figure 23A:
FIGS. 23A to 23C are diagrams used to describe the state illustrated in FIG. 22.
Figure 23B:
Figure 23C:
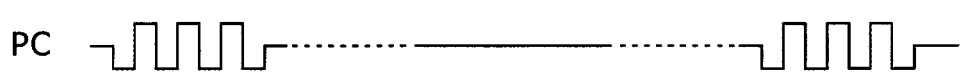

It should be noted that the active stylus 4 receives a command signal from the touch panel 1 with a core body as an antenna and transmits a position detection signal from the core body. However, the configuration of the active stylus is not limited thereto. Instead, a sleeve 42 near a core body 41 of the active stylus 4 may be made of a conductor as illustrated in FIG. 17 such that signals are exchanged with the touch panel 1 using the core body 41 and the sleeve 42. In this case, it is only necessary to use either of the core body 41 and the sleeve 42 to receive a command signal and the other to transmit a position detection signal.

It should be noted that the conductors capacitively coupled with the hand or finger whose touch was detected are connected to the circuit ground in the above embodiment. However, the conductors may be coupled with a conductor that provides a drive power supply for the touch panel (including battery power supply) rather than with the circuit ground.

It should be noted that, although described earlier, the external ground in the description of the preferred embodiments above is not limited to the earth's potential and may be a stable fixed potential.

It is to be noted that the embodiments of the present disclosure are not limited to the foregoing embodiments, and that various changes can be made without departing from the spirit of the present disclosure.

What is claimed is:

1. A touch panel including a sensor that has a plurality of conductors arranged for position detection and a signal processing circuit that can detect a position pointed to by an active stylus that transmits a signal to the sensor for position detection and a touch of a user on the sensor, the touch panel comprising:
   a signal transmission circuit configured to capacitively transmit a signal to the active stylus via the sensor;
   a position detection circuit configured to capacitively detect a position pointed to by the active stylus on the sensor by receiving the signal transmitted from the active stylus via the sensor;
   a touch detection circuit configured to detect the touch of the user by receiving a signal via the sensor in response to signal transmission via the sensor; and
   a coupling control circuit configured to couple at least one of the plurality of conductors of the sensor on which the touch of the user is conducted and a ground of the signal processing circuit in accordance with a touch detection result of the touch detection circuit, while a signal from the signal transmission circuit is capacitively transmittable to the active stylus via the sensor, wherein the pointing position detection circuit is configured to detect the position pointed to by the active stylus on the sensor without using the at least one of the plurality of conductors of the sensor while the at least one of the plurality of conductors is coupled to the ground of the signal processing circuit by the coupling control circuit.

2. The touch panel of claim 1, wherein
when the signal transmission circuit capacitively transmits the signal to the active stylus, the coupling control circuit couples the at least one of the plurality of conductors of the sensor on which the touch of the user is conducted and the ground of the signal processing circuit in accordance with the touch detection result of the touch detection circuit.

3. The touch panel of claim 1, wherein
the plurality of conductors is arranged at least in a first direction, and
when the touch of the user is detected by the touch detection circuit, at least one of the plurality of conductors arranged where the touch of the user was detected is selectively coupled with the ground of the signal processing circuit by the coupling control circuit.

4. The touch panel of claim 3, wherein
the plurality of conductors arranged at least in the first direction are used at least for signal transmission except for the at least one of the plurality of conductors selectively coupled with the ground of the signal processing circuit by the coupling control circuit.

5. The touch panel of claim 3, wherein
the plurality of conductors arranged in the first direction are used to at least transmit the signal to the active stylus and detect the touch of the user.

6. The touch panel of claim 4, wherein
the plurality of conductors arranged at least in the first direction are used for the signal transmission and signal reception, and
the signal transmission and the signal reception are switched in a time-divided manner.

7. The touch panel of claim 4, wherein
a plurality of different kinds of transmission signals are supplied to the plurality of conductors arranged at least in the first direction.

8. The touch panel of claim 7, wherein
one of the plurality of different kinds of transmission signals is used to capacitively transmit the signal to the active stylus, and
another signal of the plurality of different kinds of transmission signals is used to detect the touch of the user.

9. The touch panel of claim 7, wherein
the plurality of different kinds of transmission signals are at different frequencies.

10. The touch panel of claim 1, wherein
the plurality of conductors is arranged in a first direction and a second direction different from the first direction, and
when the touch of the user is detected by the touch detection circuit, at least one of the plurality of conductors arranged in the second direction and adjacent to an area touched by the user is selectively coupled with the ground of the signal processing circuit by the coupling control circuit.

11. The touch panel of claim 10, wherein
the plurality of conductors arranged in the first direction are used for the signal transmission and signal reception, and
the plurality of conductors arranged in the second direction are used to receive a signal.

12. The touch panel of claim 1, further comprising:
a plurality of conductors arranged electrically independently of the plurality of conductors used to capacitively transmit the signal to the active stylus and detect the touch of the user,
wherein, among the conductors arranged electrically independently, one or more conductors adjacent to an area touched by the user is coupled with the ground of the signal processing circuit.

13. The touch panel of claim 1, wherein
the plurality of conductors is arranged in a first direction and a second direction different from the first direction, and
when the touch of the user is detected by the touch detection circuit, at least one of the plurality of conductors arranged in the first and second directions and adjacent to an area touched by the user is selectively coupled with the ground of the signal processing circuit by the coupling control circuit.

14. The touch panel of claim 1, wherein
when a touched area of a predetermined size is detected by the touch panel, the coupling control circuit determines that the touched area was touched by the user.

15. The touch panel of claim 1, wherein
the coupling control circuit couples a predetermined conductor corresponding to the position where the touch of the user was detected with the ground of the signal processing circuit.

16. The touch panel of claim 1, wherein
the coupling control circuit couples a predetermined conductor corresponding to the position where the touch of the user was detected with a drive power supply of the touch panel.

17. A signal processing device connected to a touch panel including a sensor that has a plurality of conductors arranged for position detection and a signal processing circuit that detects a position pointed to by an active stylus that transmits a signal to the sensor for position detection and a touch of a user holding the active stylus, the signal processing device comprising:
a signal transmission circuit configured to capacitively transmit a signal to the active stylus via the sensor;
a pointing position detection circuit configured to capacitively detect a position pointed to by the active stylus on the sensor by receiving the signal transmitted from the active stylus via the sensor;
a touch detection circuit configured to detect the touch of the user by receiving a signal via the sensor in response to signal transmission via the sensor; and
a coupling control circuit configured to couple one or more of the plurality of conductors of the sensor on which the touch of the user is conducted and a ground of the signal processing circuit in accordance with a touch detection result of the touch detection circuit, while a signal from the signal transmission circuit is capacitively transmittable to the active stylus via the sensor,
wherein the pointing position detection circuit is configured to detect the position pointed to by the active stylus on the sensor without using the at least one of the plurality of conductors of the sensor while the at least one of the plurality of conductors is coupled to the ground of the signal processing circuit by the coupling control circuit.

18. The signal processing device of claim 17, wherein when the signal is capacitively transmitted to the active stylus, the coupling control circuit couples the at least one of the plurality of conductors of the sensor on which the touch of the user is conducted and the ground of the signal processing circuit in accordance with the touch detection result of the touch detection circuit.

19. A method of coupling an external ground and a ground of a signal processing circuit of a touch panel, the touch panel including a sensor that has a plurality of conductors arranged for position detection and the signal processing circuit detecting a position pointed to by an active stylus that transmits a signal to the sensor for position detection and a touch of a user on the sensor, the method comprising:

capacitively transmitting a signal to the active stylus via the sensor;

capacitively detecting a position pointed to by the active stylus on the sensor by receiving the signal transmitted from the active stylus via the sensor;

detecting the touch of the user by receiving a signal via the sensor in response to signal transmission via the sensor; and coupling at least one of the plurality of conductors of the sensor on which the touch of the user is conducted and a ground of the signal processing circuit in accordance with a result of the detecting, while a signal from the signal transmission circuit is capacitively transmittable to the active stylus via the sensor, wherein the position pointed to by the active stylus on the sensor is capacitively detected using the at least one of the plurality of conductors of the sensor while the at least one of the plurality of conductors is coupled to the ground of the signal processing circuit.

20. The coupling method of claim 19, wherein when the signal is capacitively transmitted to the active stylus, the coupling is performed in response to the detecting of touch of the user.

* * * * *